United States Patent [19]
Arteburn

[11] 3,740,803
[45] June 26, 1973

[54] FISHING WEIGHT CLIP

[76] Inventor: Royce L. Arteburn, 2810 Cedar Street, Baker, Oreg. 97814

[22] Filed: Mar. 15, 1972

[21] Appl. No.: 234,721

[52] U.S. Cl. .............................. 24/261 R, 43/43.12
[51] Int. Cl. ....................... A44b 21/00, A01k 95/00
[58] Field of Search .............. 24/261 R, 139, 261 B, 24/139.1, 264; 43/42.39, 42.49, 43.1, 43.12, 44.81

[56] References Cited
UNITED STATES PATENTS

| | | | |
|---|---|---|---|
| 1,460,081 | 6/1923 | Sommers | 24/264 |
| 1,590,172 | 6/1926 | Thorberg | 24/261 R |
| 1,883,574 | 10/1932 | Cleeland | 43/43.1 |
| 3,120,715 | 2/1964 | Long | 43/43.1 |
| 3,180,052 | 4/1965 | Malesko | 43/43.12 |

Primary Examiner—Donald A. Griffin
Attorney—John W. Kraft

[57] ABSTRACT

This invention is a substantially compressible resilient V-shaped body having a coil-like portion at one of its terminal ends operable to engage a fishing line and a hook at its opposite terminal end. The V-shaped body portion is operable to hold a fishing weight having a hole disposed in the body thereof by the opposing forces exerted by each of the opposing legs of the V-shaped body portion of the clip against the peripheral walls of the weight. The body portion comprises a pair of leg portions issuing upwardly at respective opposing angles from a hook-like stop portion at the lowermost portion of the body portion opposite the coil portion at the terminal end of one of the leg portions and the hook at the terminal end of the opposing leg portion.

1 Claim, 3 Drawing Figures

PATENTED JUN 26 1973  3,740,803

3,740,803

FISHING WEIGHT CLIP

FIELD OF INVENTION

The present invention relates to means of attaching fishing weights to fishing lines, and, more particularly, to means operable to release a weight attached to a line.

DESCRIPTION OF THE PRIOR ART

Fishing weights commonly known in the art are usually tied to a fishing line to cause a fish hook or lure to sink into the water. In some instances, swivel type devices having a plurality of eyelets are used and employed in fishing, to which a fish line is tied to one of the eyelets, while a lighter weight line including a hook or fish lure is tied to another eyelet, and another line having a weight tied to one of its terminal ends is tied to a further eyelet. In this manner, if either the hook or weight are snagged by rocks on the stream bed, that line to which the snagged hook or weight is attached may be broken in order to retrieve the rest of the tackle remaining. This means that the other tackle assemblies must be tied before fishing may be again commenced. Most commonly, the fishing weight is caused to be snagged on rocks since it is heavier and sinks among the rocks.

Accordingly it is an object of the present invention to provide fishing weight holding means operable to release a snagged weight from a fishing line without destroying or losing a portion of the tackle, and to retain the weight during casting and retrieving of a fishing line.

A further object of the present invention is to provide a weight-carrying means that is simple, easily attached to a fishing line, and which is slidably moveable on a line.

Another object of the present invention is to provide, in weight-carrying means, means by which a weight may be slidably mounted to the carrying means, and which means is operable to carry the weight until it is snagged in the water by a submerged article.

These and other objects shall become apparent from the description following, it being understood that modifications may be made without affecting the teachings of the invention here set out.

SUMMARY OF THE INVENTION

Generally, this invention is a substantially compressible resilient V-shaped body having a coil-like portion at one of its terminal ends operable to engage a fishing line and a hook at its opposite terminal end. The V-shaped body portion is operable to hold a fishing weight having a hold disposed in the body thereof by the opposing forces exerted by each of the opposing legs of the V-shaped body portion of the clip against the peripheral walls of the weight. The body portion comprises a pair of leg portions issuing upwardly at respective opposing angles from a hook-like stop portion at the lowermost portion of the body portion opposite the coil portion at the terminal end of one of the leg portions and the hook at the terminal end of the opposing leg portion.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
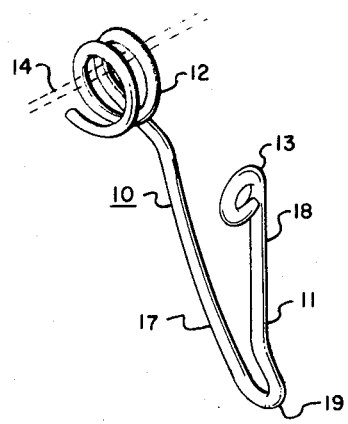
FIG. 1 is a perspective view of the fishing weight clip of this invention showing a fish line carrying the clip in broken lines for illustrative purposes.
Figure 2:
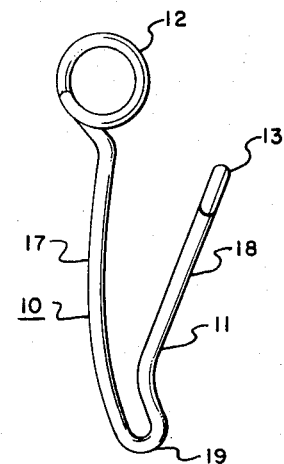
FIG. 2 is a side elevational view of the clip showing a coil-like portion at one of the terminal ends of the substantially V-shaped body of the clip, a hook-like stop portion at the end opposite, and a hook portion at the other terminal end, the clip being in its normal at rest position.
Figure 3:
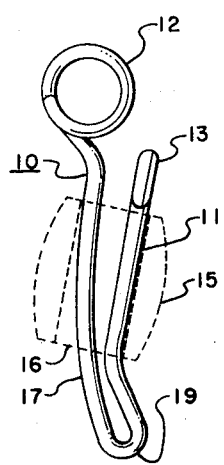
FIG. 3 is a side elevational view of a clip having a fishing weight, including a hole in the body thereof, shown in broken lines mounted on and carried by the clip for illustrative purposes.

Referring now to the drawings and, more particularly, to the FIGS. 1 and 2, the fishing weight clip of the present invention is shown to advantage and generally designated by the numeral 10. The clip 10 is preferably made from a resilient spring-like material, such as spring steel. The clip 10 comprises a V-shaped body portion 11 issuing into a coil-like portion 12 at one of its terminal ends and a hook 13 at its opposite terminal end. The coil-like portion 12 is operable to receive a fishing line 14 shown in broken lines in the FIG. 1. In order to attach the line 14 to the coil-like portion 12, the line 14 is passed by the terminal end of portion 12 in a wrapping motion around the coil until the line 14 is passed through the coil. The clip 10 may be secured at any point along a fishing line 14 merely by tying a half hitch knot to the coil 12. A fishing weight 15, having a hole 16 disposed in the body thereof, such as shown in broken lines in the FIG. 3, may be secured to the clip 10 by forcing together the opposing legs of the V-shaped body portion 11. The hook 13 acts as a stop for the weight 15, as well as means by which the opposing legs may be squeezed together. Frequently, in fishing, weights tend to be caught between rocks on the bottom of a stream bed; and all of the fishing tackle, including lures, hooks, and bait, is lost in trying to free the weight. In the present invention, the weight 15 may be pulled from the clip 10.

The body portion 11 comprises a pair of opposing leg portions 17 and 18 issuing upwardly at respective angles from a hook-like stop portion 19 at the lowermost portion of the body portion 11 opposite the coil portion 12 on the terminal end of the leg 17 and the hook 13 on the terminal end of the leg 18. As shown to advantage in FIG. 3, the weight 15 tends to be urged outwardly at one end of the weight 15 by the resilient leg 18; and the opposite end of the weight 15 tends to rest against the hook-like stop portion 19. In casting, a weight 15 tends to be held by the clip 10.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A fishing weight clip of the character described comprising a substantially V-shaped body of spring-like resilient material formed from wire-like material, said body comprising a pair of opposing leg portions issuing upwardly at opposing angles so as to diverge away from a hook-like stop portion provided at and spaced slightly from the lowermost terminal end of said body portion, said body portion having an open coil-like portion at the terminal end of one of the leg portions opposite said hook-like stop portion and a hook at the terminal end of the other said opposing leg portion adapted to receive a fishing line weight so that said weight may be passed thereover, said pair of opposing leg portions being adapted to be compressed toward each other to receive and maintain an apertured weight thereon.

* * * * *